United States Patent

[11] 3,596,887

| [72] | Inventor | Robert L. Castine<br>Blue Island, Ill. |
|---|---|---|
| [21] | Appl. No. | 749,519 |
| [22] | Filed | Aug. 1, 1968 |
| [45] | Patented | Aug. 3, 1971 |
| [73] | Assignee | D. Burnel Klopfenstein<br>Hammond, Ind.<br>a part interest |

[54] POST CARBURETOR FUEL CHARGE FORMING DEVICE
9 Claims, 5 Drawing Figs.

| [52] | U.S. Cl. | 261/145,<br>261/161, 261/156, 123/122 D |
|---|---|---|
| [51] | Int. Cl. | F02m 23/14,<br>F02m 31/06 |
| [50] | Field of Search | 261/145,<br>161, 144, 156; 123/122 D, 122 H, 122 A |

[56] References Cited
UNITED STATES PATENTS

| 911,967 | 2/1909 | Fox | 261/144 |
|---|---|---|---|
| 1,135,113 | 4/1915 | Hitchcock | 261/161 X |
| 1,482,175 | 1/1924 | Wilson | 123/122 (D) |
| 1,688,604 | 10/1928 | Welch | 261/145 X |
| 1,824,926 | 9/1931 | Pokorny | 123/122 (H) |
| 2,351,494 | 6/1944 | Wall | 261/156 X |
| 3,221,719 | 12/1965 | Ulrich | 123/122 X |

*Primary Examiner*—Tim R. Miles
*Attorney*—Hill, Sherman, Meroni, Gross and Simpson ABSTRACT: A device interposed between the carburetor and intake manifold of an internal combustion engine preventing raw fuel feed to the engine and supplying heated air to the fuel-air mixture from the carburetor for enhancing fuel combustion and engine efficiency and for minimizing air pollutants in the engine exhaust.

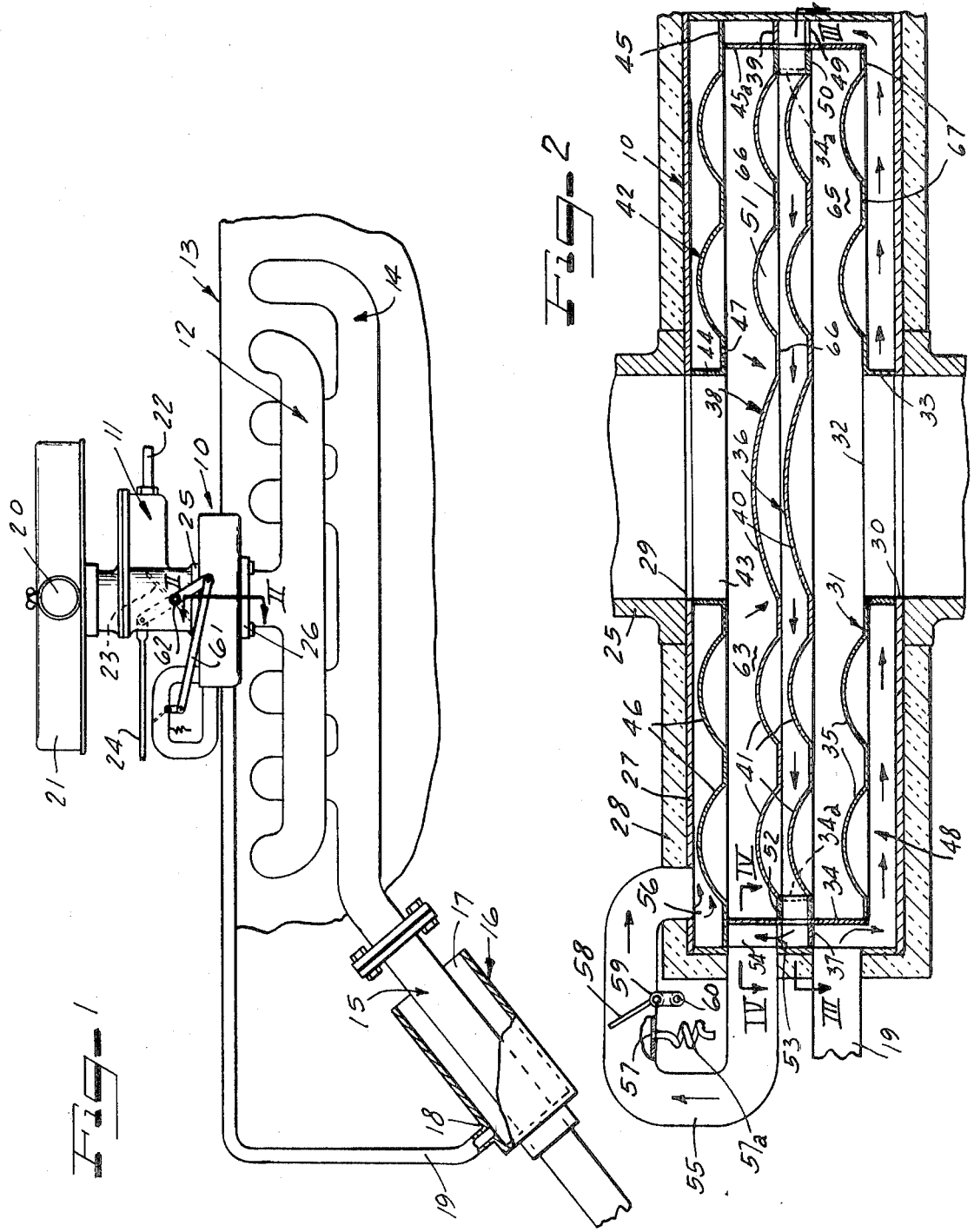

Patented Aug. 3, 1971 3,596,887
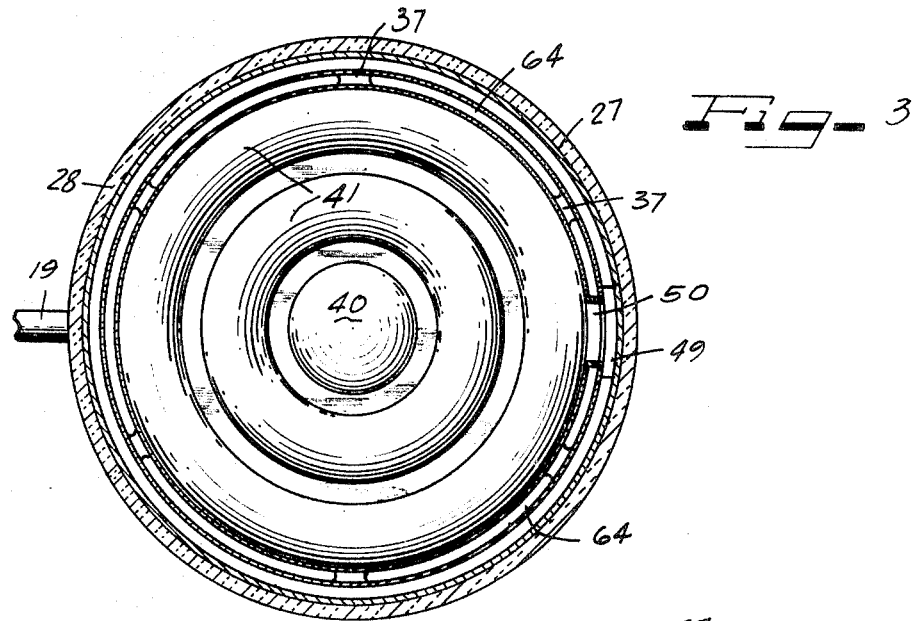
Fig_3
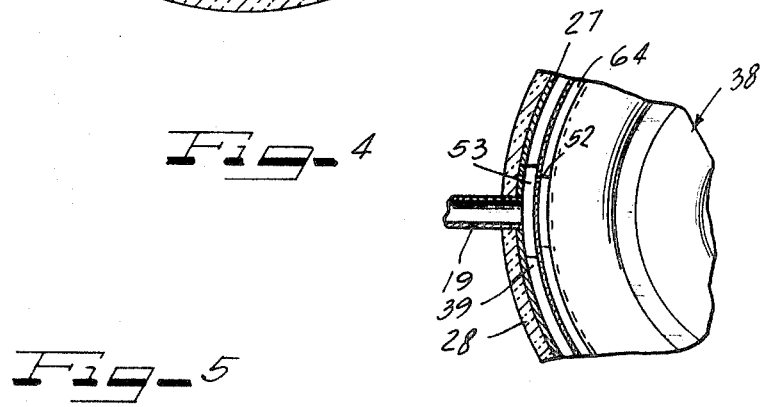
Fig_4
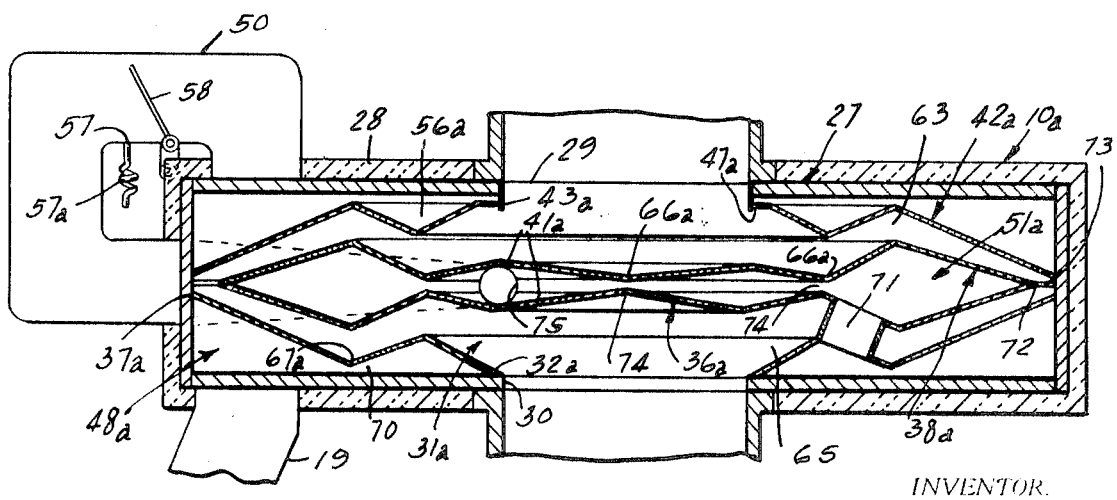
Fig_5
INVENTOR.
ROBERT L. CASTINE
BY *[signature]* ATTORNEYS

POST CARBURETOR FUEL CHARGE FORMING DEVICE

FIELD OF THE INVENTION

This invention relates to fuel charge forming devices or vaporizers for internal combustion engines having heat exchanger and air addition functions.

PRIOR ART

Prior known devices for increasing fuel combustion efficiency in internal combustion engines have been in the form of heaters mounted on or in the intake manifold of the engine. These known devices were not capable of completely eliminating raw fuel feed to the engine. Examples of such devices are shown in the Gurley U.S. Pat. No. 2,700,722 dated Jan. 25, 1955 and in the Balzer et al. U.S. Pat. No. 2,719,520 granted Oct. 4, 1955. while some of these devices, such as for example the device of the Titus U.S. Pat. No. 2,720,197 granted Oct. 11, 1955, had means for admitting air to the heater, the air was unheated and its flow was controlled only by intake manifold pressure.

SUMMARY

According to this invention, there is now provided a fuel charge forming device for mounting between the carburetor and intake manifold of an internal combustion engine which has extended heat exchange surfaces for heating the fuel-air mixture from the carburetor before it reaches the intake manifold. These surfaces prevent dripping of raw fuel into the intake manifold. Free heated air is also supplied to the fuel-air mixture en route to the intake manifold and this free heated air feed is mechanically controlled by a valve linked to the butterfly valve of the carburetor in such a way that the heated air feed is increased with the fuel-air feed from the carburetor instead of only being increased when the intake manifold pressure is reduced. The device of this invention, therefore, supplies more air with the flow of more fuel contrasted with the prior art where additional air is supplied when the intake manifold pressure is reduced as when the carburetor valve is closed.

In the device of this invention, corrugated heat exchanger plates are so arranged that the fuel-air mix from the carburetor must flow along an extended sinuous path in intimate heat exchange relation therewith. These corrugated plates are heated by outside air, i.e. heated by the engine exhaust. This heated air is then supplied to fuel-air mix from the carburetor in amounts controlled by the carburetor flow control or butterfly valve. The arrangement is such that as the carburetor valve opens wider the proportion of heated air fed to the device will be increased.

The device of this invention not only increases the engine efficiency but also enhances fuel combustion to such an extent that unburned hydrocarbons are substantially completely eliminated from the engine exhaust thereby preventing air pollution in the operation of the engine. The device supplies secondary air for combustion in a heated condition and in amounts which will substantially prevent carbon monoxide discharge from the engine.

It is then an object of this invention to provide a post carburetor fuel charge forming device with extended heat exchange surfaces for efficiently heating the fuel-air mix from the carburetor and a secondary air intake which supplied heated air in amounts insuring thorough combustion of the fuel-air mix in the engine to substantially eliminate discharge of air pollutants by the engine.

Another object of the invention is to provide a fuel vaporizer or gas generator for mounting between the carburetor and intake manifold of an internal combustion engine which eliminates raw fuel feed to the engine and minimizes discharge of air pollutants by the engine.

Another object of the invention is to provide a fuel charge forming device for insertion between the carburetor and intake manifold of an internal combustion engine which not only heats the fuel-air mix from the carburetor before it reaches the intake manifold but also supplies heated secondary air to this fuel-air mix in amounts controlled by the carburetor valve.

A specific object of the invention is to provide a gas vaporizer for internal combustion engines having a stack of corrugated plates heated by exhaust gas heated air and providing extended heat exchange surfaces for the fuel-air mix in the carburetor of an internal combustion engine.

Other further objects of this invention will become apparent to those skilled in this art from the following detailed description of the annexed sheets of drawings which show a preferred embodiment of the invention.

BRIEF DESCRIPTION OF THE DRAWINGS

FIG. 1 is a somewhat diagrammatic fragmentary side elevational view equipped with the device of this invention.

FIG. 2 is a vertical cross-sectional view taken generally along the line II–II of FIG. 1.

FIG. 3 is a horizontal cross-sectional view taken along the line III–III of FIG. 2.

FIG. 4 is a fragmentary horizontal cross-sectional view taken along the line IV–IV of FIG. 2.

FIG. 5 is a cross-sectional view similar to FIG. 2 of a modified device of this invention.

DESCRIPTION OF THE PREFERRED EMBODIMENT

The device 10 of this invention as sown in FIG. 1 is mounted between the carburetor 11 and intake manifold 12 of an internal combustion engine 13. The exhaust manifold 14 of the engine discharges to an exhaust pipe 15 which is surrounded by a sleeve 16 having an air scoop open front end 17 and an air outlet 18 connected by a duct or conduit 19 to the device 10 of this invention.

The carburetor 11 receives air through an air scoop or inlet 20 to the conventional filter 21 mounted on top of the carburetor. Gasoline is fed to the carburetor from a supply tube 22. The carburetor has the conventional butterfly valve 23 controlled by a link 24 from the accelerator pedal (not shown) and this valve controls the air-fuel mix flow to the carburetor outlet 25 which is usually mounted on the inlet 26 of the intake manifold 12.

In accordance with this invention, the device 10 is mounted between the outlet 25 of the carburetor 11 and the intake 26 of the intake manifold 12.

The device 10 has metal cylindrical drumlike housing 27 covered with insulation 28 with an inlet 29 registering with and mounted on the carburetor outlet 25 and an outlet 30 registering with and mounted on the inlet 26 of the intake manifold.

A bottom corrugated plate 31 is positioned in the housing 27 and has a central hole 32 therethrough registering with the outlet 30 of the housing and surrounded by a collar 33 resting on the bottom wall of the housing so that the plate 31 is spaced above this bottom wall. The plate has an upstanding skirt or collar 34 around its outer periphery spaced inwardly from the periphery of the housing 27. Concentric bulges or corrugations 35 are formed on the plate between the collars 33 and 34 to increase the surface area of the plate.

A second corrugated plate 36 is mounted in the housing 27 and rests on the skirt 34 of the plate 31. This plate 36 has a peripheral margin 37 spanning the gap between the skirt 34 and the peripheral wall of the housing.

A third plate 38 overlies the plate 36 in spaced parallel relation and also has a peripheral margin 39 extending to the peripheral wall of the housing. The plates 36 and 38 do not have a central peripheral hole therethrough as does the plate 31 but instead have solid central bulges or corrugations 40. Rings of bulges or corrugations 41 surround the central bulges 40 and a collar or skirt 34a extends between the margin 37 of plate 36 and the margin 39 of plate 38 inwardly from the peripheries of these margins.

A fourth or top plate 42 is mounted in the top of the housing 27 and has a central hole 43 thereof surrounded by an upstanding flange or collar 44 registering with the inlet 29 of the housing 27. This top plate 42 also has a peripheral margin 45 extending to the peripheral wall of the housing. A collar or skirt 45a extends between the margin 39 of the plate 38 and the margin 45 of the plate 42.

The plate 42 has upwardly bowed concentric bulges or corrugations 46 similar to the bottom plate 31.

The portion of the plate 42 between the collar 44 and the inner bulge 46 is perforated at 47 providing a ring of perforations.

As shown in FIG. 2, there is provided an annular chamber 48 between the bottom wall of the housing and the bottom plate 31 which chamber is closed at its top by the marginal wall 37 of the second plate 36 and is closed around its inner periphery by the collar 33 of the plate 31. This chamber communicates with the heated air inlet conduit 19 and, as shown by the arrows, air from this conduit flows through the chamber to an outlet slot 49 in the margin 37 of the plate 36 which slot is positioned diametrically opposite the inlet conduit 19 so that the heated air must flow completely through the chamber 48 to heat all surfaces of the plate 31 before it reaches this outlet slot 39. A tube 50 connects the slot 49 with a chamber 51 between the plates 36 and 38 inwardly on the collar 34a so that the heated air from the chamber 48 flows through the slot and tube into the chamber 51. Diametrically opposite the tube 50 there is provided a second tube 52 receiving the air from the chamber 51 and this tube 52 discharges through a slot 53 in the peripheral margin 39 of the plate 38 into an annular passage 54 between the skirt 45a and the sidewall of the housing. This passage 54 is closed at its bottom by the peripheral margin 39 of the plate 38 and by the peripheral margin 45 of the plate 42.

An air conduit or tube 55 receives the heated air from the annular passage 54 and discharges into the chamber 56 provided between the plate 42 and the top wall of the housing 27. As shown by the arrows, the heated air flows through this conduit into the chamber 56 and then through the perforations 47.

The flow of air through conduit 55 which is allowed to enter the chamber 56 is controlled by a gate valve 58 secured on a pivot 59 which is rotated by an arm 60 connected to a link 61 which in turn is linked to the pivot 62 for the butterfly valve 23. The arrangement is such that when the valve 23 is opened, the gate valve 58 will open to allow the proper amount of air in the conduit 55 to flow to the chamber 56. Conversely, when the butterfly valve 23 is closed, even though the intake manifold pressure is reduced, the supply of air to the perforations 47 will be cut down since the gate valve 58 will be proportionately closed in the conduit 55 to restrict or prevent all or most of the heated air to enter chamber 56. Some outside air may be admitted into conduit 55 through inlet 57 which has a restricting coil 57a communicating with the atmosphere.

The fuel-air mix from the carburetor flows through the inlet 29 of the housing 27 and the central hole 43 of the plate 42 where it is impinged against the domelike arch of the corrugations 40 of the top plate 38 and then caused to flow laterally through the chamber 63 between the plates 38 and 42. The margins 37 and 39 of the plates 36 and 38 have aligned elongated slots 64 therethrough radially inward of the collars or skirts 34 and 46 so that the fuel-air mix from the chamber 63 flows through the slots into the periphery of a chamber 65 between the plates 31 and 36 from which the mixture flows radially inward along the extended corrugated surfaces of these plates to the outlet hole 32 and thence through the outlet 30 of the housing 27.

In FIG. 5 of a somewhat simplified device 10a of this invention is illustrated and parts identical with or substantially identical with parts shown in the device 10 have been marked with the same reference numerals. A shown a bottom corrugated plate 31a is secured in the bottom of the housing 27 and performs the functions of the plate 31 of the device 10. Plate 31a has a central hole 32a registering with the outlet 30, has angular annular corrugations 35a with a trough 67a therebetween and has a peripheral margin 37a tightly engaging and sealed to the peripheral wall of the housing 27.

A bottom chamber 48a between the bottom wall of the housing and the plate 31a receives heated air from the duct 19 which as shown communicates through the bottom wall of the housing at the periphery thereof so that the hot air enters the periphery of the chamber 48a to flow all around the chamber and through the narrow annular gap 70 under the trough 67a to spread out and heat the entire plate 31a.

Diametrically opposite the inlet from the pipe 19 an upstanding tube 71 discharges the heated air from the radial inner end of the chamber 48a into the radial outer end of a chamber 51a between corrugated plates 36a and 38a spanning the housing 27 midway between the top and bottom thereof. The peripheries of these plates merge at 72 but are tacked to the sidewall of the housing by several fingers or struts 73 at spaced intervals around the housing. The plates 36a and 38a have concentric annular corrugations 41a with troughs 66a therebetween forming narrow gaps 74 in the chamber 51a so that hot air from the tube 71 will be distributed all around the chamber, as it flows to an outlet 75 diametrically opposite and radially inward from the tube 71. The outlet 75 discharges to the tube 50 which in turn discharges into the periphery of the chamber 56a between a top corrugated plate 42a corresponding with the plate 42. Thus plate 42a has a hole 43a mating with the inlet 29 and slots such as 47a around the hole discharge the hot air into the fuel-air mix receiving chamber 63.

The fuel-air mixture flows radially outward in the chamber or passage 63 to the peripheral gap 72 and thence radially inward through the passage 65 to the outlet 30. The corrugations of the plates defining the passages 63 and 65 cooperate to spread out the mix evenly over all surfaces of the plates without obstructing free flow so that good heat exchange relationship with the plates is insured. Of course the hot air from the slots 43a is drawn into the air-fuel mix as it enters the chamber 63.

It will, therefore, be understood that the device 10 provides countercurrent flow paths for heated air and for the fuel-air mix from the carburetor with extensive heat exchange surfaces between the two flow paths. The heated air from the inlet 19 flows through a bottom chamber between a bottom corrugated plate and the bottom wall of the housing, thence through a tube 50 through an intermediate chamber 51, thence through an outlet tube 52 to an annular chamber 54, thence through the conduit 55 either to the outlet 57 or top chamber 56 depending on the position of the gate valve 58 and thence through the perforations 47 to provide the secondary heated air to the fuel-air mix. The fuel-air mix, on the other hand, flows into the device into the annular chamber 67 where it aspirates air through the perforations 47 as it flows laterally over the heated plates 38 and 42 and then flows through slots 64 and to the bottom chamber 65 through which it flows radially inward to the outlet of the device. The heat exchange flow paths are quite extensive and very efficient.

It will also be noted from FIG. 2 that the discharge from the carburetor can never drip into the intake manifold and any raw fuel will be trapped in the chamber 63 which in effect has annular wells 66 between the corrugations 40 and 41 trapping liquid fuel. Any raw fuel entering the chamber 63 should be vaporized before it can reach the outlets slots 64 and the secondary air from the perforations 47 will insure sufficient oxygen for combustion of this fuel. Even though raw fuel should spill through the outlet slots 64, it will still be trapped in the wells 67 between the corrugations 35 of the bottom plate 31 before it can reach the outlet 30.

The device 10a operates in the same manner as the device 10.

From the above descriptions, it will therefore be understood that this invention provides a vaporizer, heat exchanger, or fuel charge forming device, for internal combustion engines which not only increases the engine efficiency but also reduces air pollutants in the engine exhaust.

Although I have herein set forth my invention with respect to certain specific principles and details thereof, it will be understood that these may be varied without departing from the spirit and scope of the invention as set forth in the hereunto appended claims.

I claim as my invention:

1. A post carburetor fuel charging device adapted to be interposed between the carburetor and intake manifold of an internal combustion engine which comprises a drumlike insulated container having a top inlet to be mounted on the carburetor outlet and a bottom outlet to be mounted on the intake manifold inlet, plates in said container cooperating with the container to provide elongated separated air flow and fuel-air mix passages in heat exchange relation, means for introducing heated air to the air flow passage, means controlled by the carburetor flow valve regulating the flow of said air into the fuel-air mix passage, and means preventing the flow of raw fuel to the outlet.

2. The device of claim 1 including superimposed corrugated plates with concentric circular corrugations having valleys providing traps for arresting flow of raw fuel.

3. The device of claim 1 wherein the air path is initially along the bottom wall of the container, thence through an intermediate passage between the top and bottom walls and thence through a passage under the top wall of the container and the fuel-air mix path is initially through the top opening of the container thence radially outward to the periphery of the container, thence radially inward to the outlet of the container.

4. A post carburetor fuel charging device which comprises a cylindrical container having a central top inlet and a central bottom outlet adapted to respectively register with a carburetor outlet and an intake manifold of an internal combustion engine, plates in said container providing an elongated sinuous path for the fuel-air mix from the inlet to the outlet and trapping flow of raw fuel to the outlet, said plates cooperating with said container to provide a sinuous air flow path separated from the fuel-air mix path in extended heat exchange relation, means for introducing heated air to said air path, means for bleeding heated air from said air path into said fuel-air mix path for introducing secondary heated air to the air-fuel mix, and means controlling the flow of said secondary air into the fuel-air mix.

5. The device of claim 4 wherein the container has spaced, superimposed corrugated plates defining the air flow and fuel-air mixture flow paths with some of the plates preventing direct flow of the fuel-air mix from the inlet to the outlet.

6. The device of claim 4 wherein the container has top and bottom compartments for flow of the fuel-air mixture surrounded by compartments for flow of heated air and wherein the fuel-air mixture flows radially outward through the top compartment and radially inward through the bottom compartment.

7. The device of claim 4 including a bleeder valve connected to the carburetor flow valve through a linkage which opens the bleeder valve as the carburetor flow valve opens to increase the air flow to the device.

8. A post carburetor vaporizer device for an internal combustion engine to be mounted between the carburetor outlet and the intake manifold of the engine which comprises a housing having a central inlet and a central outlet, an air heater adapted to be heated by exhaust gases from the internal combustion engine, means for supplying hot air from the heater to said device, sinuous counterflow separated passages for hot air from said air heater and for the fuel-air mix from the carburetor in heat exchange relation in said housing, means for bleeding hot air into said fuel-air mix passage near the entrance to said passage from the carburetor, and valve means controlled by an accelerator linkage regulating the amount of hot air feed to the fuel-air mixture.

9. A fuel charge device which comprises a cylindrical container having central aligned top and bottom openings, a stack of spaced, superimposed corrugated plates in said container including top and bottom plates cooperating with the top and bottom walls of container to form an air flow path and intermediate plates between the top and bottom plates cooperating therewith to form fuel-air mix paths and cooperating with each other to form therebetween an air path, said intermediate plates having a central arch spanning the inlet and outlet to prevent direct flow therebetween, and means for bleeding air from the air path into the fuel-air mix path adjacent the inlet thereto.